(12) United States Patent
Kumar (10) Patent No.: US 9,174,169 B2
(45) Date of Patent: *Nov. 3, 2015

(54) MOUNTING MAT FOR EXHAUST GAS TREATMENT DEVICE

(75) Inventor: Amit Kumar, Getzville, NY (US)

(73) Assignee: Unifrax I LLC, Tonawanda, NY (US)

(*) Notice: Subject to any disclaimer, the term of this patent is extended or adjusted under 35 U.S.C. 154(b) by 998 days.

This patent is subject to a terminal disclaimer.

(21) Appl. No.: 12/855,455

(22) Filed: Aug. 12, 2010

(65) Prior Publication Data

US 2011/0036063 A1 Feb. 17, 2011

Related U.S. Application Data

(60) Provisional application No. 61/234,026, filed on Aug. 14, 2009.

(51) Int. Cl.
*B01D 39/14* (2006.01)
*B01D 39/06* (2006.01)
*B01D 24/00* (2006.01)
*B01D 50/00* (2006.01)
*F01N 3/00* (2006.01)
*B01D 53/88* (2006.01)
*F01N 3/28* (2006.01)

(52) U.S. Cl.
CPC .............. *B01D 53/88* (2013.01); *F01N 3/2857* (2013.01); *B01D 2257/404* (2013.01); *B01D 2257/502* (2013.01); *B01D 2257/702* (2013.01); *Y10T 428/233* (2015.01); *Y10T 428/24998* (2015.04); *Y10T 428/249978* (2015.04)

(58) Field of Classification Search
USPC ............ 55/522–524; 422/169–172, 177–182; 60/297
See application file for complete search history.

(56) References Cited

U.S. PATENT DOCUMENTS

| | | |
|---|---|---|
| 3,224,927 A | 12/1965 | Brown et al. |
| 3,458,329 A | 7/1969 | Owens et al. |
| 3,649,406 A | 3/1972 | McNish |

(Continued)

FOREIGN PATENT DOCUMENTS

| | | |
|---|---|---|
| DE | 196 38 542 A1 | 3/1997 |
| DE | 198 53 422 A1 | 5/2000 |

(Continued)

OTHER PUBLICATIONS

Kumar et al., Multiple Layer Substrate Support and Exhaust Gas Treatment Device, Aug. 12, 2010, Claims.*

(Continued)

*Primary Examiner* — Amber Orlando
(74) *Attorney, Agent, or Firm* — Curatolo Sidoti Co., LPA; Salvatore A. Sidoti; Daniel E. Moderick, Jr.

(57) ABSTRACT

Disclosed is a mat or molded pre-form that may be used as a mounting mat to mount a fragile monolith within an outer housing of an exhaust gas treatment device, such as automotive catalytic converters and diesel particulate traps. The mat or pre-form may also be used as thermal insulation in the end cone regions of the exhaust gas treatment device. The mat and pre-form includes an inorganic microporous insulation component and a flexible fibrous material component. Exhaust gas treatment devices and methods for making exhaust gas treatment devices including the mat or pre-form are also disclosed.

8 Claims, 5 Drawing Sheets

(56) References Cited

U.S. PATENT DOCUMENTS

| | | |
|---|---|---|
| 3,771,967 A | 11/1973 | Nowak |
| 3,798,006 A | 3/1974 | Balluff |
| 3,916,057 A | 10/1975 | Hatch et al. |
| 3,996,145 A | 12/1976 | Hepburn |
| 4,048,363 A | 9/1977 | Langer et al. |
| 4,093,423 A | 6/1978 | Neumann |
| 4,101,280 A | 7/1978 | Frietzsche et al. |
| 4,142,864 A | 3/1979 | Rosynsky et al. |
| 4,156,533 A | 5/1979 | Close et al. |
| 4,159,205 A | 6/1979 | Miyahara et al. |
| 4,204,907 A | 5/1980 | Korklan et al. |
| 4,239,733 A | 12/1980 | Foster et al. |
| 4,269,807 A | 5/1981 | Bailey et al. |
| 4,271,228 A | 6/1981 | Foster et al. |
| 4,277,269 A | 7/1981 | Sweeting |
| 4,279,864 A | 7/1981 | Nara et al. |
| 4,305,992 A | 12/1981 | Langer et al. |
| 4,328,187 A | 5/1982 | Musall et al. |
| 4,332,852 A | 6/1982 | Korklan et al. |
| 4,335,077 A | 6/1982 | Santiago et al. |
| 4,353,872 A | 10/1982 | Midorikawa |
| 4,385,135 A | 5/1983 | Langer et al. |
| 4,617,176 A | 10/1986 | Merry |
| 4,693,338 A | 9/1987 | Clerc |
| 4,735,757 A | 4/1988 | Yamamoto et al. |
| 4,746,570 A | 5/1988 | Suzaki et al. |
| 4,752,515 A | 6/1988 | Hosoi et al. |
| 4,797,263 A | 1/1989 | Oza |
| 4,863,700 A | 9/1989 | Ten Eyck |
| 4,865,818 A | 9/1989 | Merry et al. |
| 4,927,608 A | 5/1990 | Wörner et al. |
| 4,929,429 A | 5/1990 | Merry |
| 4,985,212 A | 1/1991 | Kawakami et al. |
| 4,999,168 A | 3/1991 | Ten Eyck |
| 5,008,086 A | 4/1991 | Merry |
| 5,032,441 A | 7/1991 | Ten Eyck et al. |
| 5,073,432 A | 12/1991 | Horikawa et al. |
| 5,079,280 A | 1/1992 | Yang et al. |
| 5,094,073 A | 3/1992 | Wörner et al. |
| 5,094,074 A | 3/1992 | Nishizawa et al. |
| 5,119,551 A | 6/1992 | Abbott |
| 5,145,811 A | 9/1992 | Lintz et al. |
| 5,151,253 A | 9/1992 | Merry et al. |
| 5,242,871 A | 9/1993 | Hashimoto et al. |
| 5,250,269 A | 10/1993 | Langer |
| 5,254,410 A | 10/1993 | Langer et al. |
| 5,258,216 A | 11/1993 | Von Bonin et al. |
| 5,290,522 A | 3/1994 | Rogers et al. |
| 5,332,609 A | 7/1994 | Corn |
| 5,332,699 A | 7/1994 | Olds et al. |
| 5,340,643 A | 8/1994 | Ou et al. |
| 5,376,341 A | 12/1994 | Gulati |
| 5,380,580 A | 1/1995 | Rogers et al. |
| 5,384,188 A | 1/1995 | Lebold et al. |
| 5,389,716 A | 2/1995 | Graves |
| 5,453,116 A | 9/1995 | Fischer et al. |
| 5,482,686 A | 1/1996 | Lebold et al. |
| 5,488,826 A | 2/1996 | Paas |
| 5,502,937 A * | 4/1996 | Wilson ............................ 52/273 |
| 5,523,059 A | 6/1996 | Langer |
| 5,541,424 A | 7/1996 | Gräber |
| 5,556,689 A | 9/1996 | Kratel et al. |
| 5,580,532 A | 12/1996 | Robinson et al. |
| 5,585,312 A | 12/1996 | Ten Eyck et al. |
| 5,666,726 A | 9/1997 | Robinson et al. |
| 5,685,932 A | 11/1997 | Stohr et al. |
| 5,703,147 A | 12/1997 | Martin et al. |
| 5,714,421 A | 2/1998 | Olds et al. |
| 5,736,109 A | 4/1998 | Howorth et al. |
| 5,811,063 A | 9/1998 | Robinson et al. |
| 5,811,360 A | 9/1998 | Jubb |
| 5,814,548 A | 9/1998 | Gräber |
| 5,821,183 A | 10/1998 | Jubb |
| 5,853,675 A | 12/1998 | Howorth |
| 5,862,590 A | 1/1999 | Sakashita et al. |
| 5,869,010 A | 2/1999 | Langer |
| 5,874,375 A | 2/1999 | Zoitos et al. |
| 5,882,608 A | 3/1999 | Sanocki et al. |
| 5,911,903 A | 6/1999 | Eyhorn et al. |
| 5,928,975 A | 7/1999 | Jubb |
| 5,955,177 A | 9/1999 | Sanocki et al. |
| 5,955,389 A | 9/1999 | Jubb |
| 6,000,131 A | 12/1999 | Schmitt |
| 6,025,288 A | 2/2000 | Zoitos et al. |
| 6,030,910 A | 2/2000 | Zoitos et al. |
| 6,051,193 A | 4/2000 | Langer et al. |
| 6,099,931 A * | 8/2000 | Heller et al. ............................ 428/68 |
| 6,101,714 A | 8/2000 | Schmitt |
| 6,158,120 A | 12/2000 | Foster et al. |
| 6,162,404 A | 12/2000 | Tojo et al. |
| 6,183,852 B1 | 2/2001 | Rorabaugh et al. |
| 6,231,818 B1 | 5/2001 | TenEyck |
| 6,317,976 B1 | 11/2001 | Aranda et al. |
| 6,589,488 B1 | 7/2003 | Eyhorn |
| 6,726,884 B1 | 4/2004 | Dillon et al. |
| 6,737,146 B2 | 5/2004 | Schierz et al. |
| 6,756,107 B1 | 6/2004 | Schierz et al. |
| 6,773,618 B2 | 8/2004 | Eyhorn et al. |
| 6,855,298 B2 | 2/2005 | TenEyck |
| 6,861,381 B1 | 3/2005 | Jubb et al. |
| 6,923,942 B1 | 8/2005 | Shirk et al. |
| 6,953,757 B2 | 10/2005 | Zoitos et al. |
| 7,033,412 B2 | 4/2006 | Kumar et al. |
| 7,153,796 B2 | 12/2006 | Jubb et al. |
| 7,259,118 B2 | 8/2007 | Jubb et al. |
| 7,261,864 B2 | 8/2007 | Watanabe |
| 7,387,822 B2 | 6/2008 | Dinwoodie |
| 7,550,118 B2 | 6/2009 | Merry |
| 7,820,117 B2 | 10/2010 | Peisert et al. |
| 7,887,917 B2 | 2/2011 | Zoitos et al. |
| 7,971,357 B2 | 7/2011 | Ten Eyck et al. |
| 8,017,085 B2 * | 9/2011 | Fernandes, Jr. ............... 422/179 |
| 2001/0036427 A1 | 11/2001 | Yamada et al. |
| 2002/0025904 A1 | 2/2002 | Goto et al. |
| 2002/0127154 A1 | 9/2002 | Foster et al. |
| 2003/0049180 A1 | 3/2003 | Fukushima |
| 2003/0106311 A1 | 6/2003 | Moore et al. |
| 2003/0185724 A1 | 10/2003 | Anji et al. |
| 2004/0052694 A1 | 3/2004 | Nishikawa et al. |
| 2004/0234436 A1 | 11/2004 | Howorth |
| 2005/0167354 A1 | 8/2005 | Caze et al. |
| 2005/0232827 A1* | 10/2005 | Merry ............................ 422/179 |
| 2005/0272602 A1 | 12/2005 | Ninomiya |
| 2006/0008395 A1 | 1/2006 | Ten Eyck et al. |
| 2006/0153746 A1 | 7/2006 | Merry et al. |
| 2006/0154040 A1 | 7/2006 | Merry |
| 2006/0278323 A1 | 12/2006 | Eguchi |
| 2007/0065349 A1 | 3/2007 | Merry |
| 2007/0207069 A1 | 9/2007 | Kariya et al. |
| 2008/0253939 A1 | 10/2008 | Hornback |
| 2009/0060800 A1 | 3/2009 | Fernandes, Jr. |
| 2009/0060802 A1 | 3/2009 | Beauharnois |
| 2009/0114097 A1 | 5/2009 | Saiki |
| 2009/0162256 A1 | 6/2009 | Ten Eyck et al. |
| 2010/0207298 A1 | 8/2010 | Kunze et al. |
| 2010/0209306 A1 | 8/2010 | Kunze et al. |

FOREIGN PATENT DOCUMENTS

| | | |
|---|---|---|
| EP | 0 205 704 A1 | 12/1986 |
| EP | 0 319 299 A2 | 6/1989 |
| EP | 0 508 751 A1 | 10/1992 |
| EP | 0 551 532 A1 | 7/1993 |
| EP | 0 643 204 A2 | 3/1995 |
| EP | 0 765 993 A1 | 4/1997 |
| EP | 0 803 643 A1 | 10/1997 |
| EP | 1 495 807 A1 | 1/2005 |
| EP | 1 696 110 A1 | 8/2006 |
| EP | 1 905 895 A1 | 4/2008 |
| EP | 1 931 862 A1 | 6/2008 |
| EP | 1 950 035 A1 | 7/2008 |
| EP | 1 830 043 A1 | 3/2009 |
| GB | 1 438 762 A | 6/1976 |
| GB | 1 513 808 A | 6/1978 |

(56) References Cited

FOREIGN PATENT DOCUMENTS

| | | |
|---|---|---|
| GB | 2171180 A | 8/1986 |
| GB | 2 200 129 A | 7/1988 |
| JP | 63-138112 | 6/1988 |
| JP | 4-83773 A | 3/1992 |
| JP | 6-272549 | 9/1994 |
| JP | 7-286514 | 10/1995 |
| WO | WO 91/11498 A1 | 8/1991 |
| WO | WO 93/13560 A1 | 7/1993 |
| WO | WO 97/32118 A1 | 9/1997 |
| WO | WO 99/23370 A1 | 5/1999 |
| WO | WO 99/46028 A1 | 9/1999 |
| WO | WO 00/75496 A1 | 4/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2007/030410 | 3/2007 |
| WO | WO 2007/044485 | 4/2007 |
| WO | WO 2008/103525 A2 | 8/2008 |
| WO | WO 2008/154078 A1 | 12/2008 |
| WO | WO 2008/156942 A1 | 12/2008 |
| WO | WO 2009/032147 A2 | 3/2009 |
| WO | WO 2010/024920 A1 | 3/2010 |

OTHER PUBLICATIONS

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.

Maret, Gulati, Lambert & Zink. Systems Durability of a Ceramic Racetrack Converter. International Fuels and Lubricants Meeting, Toronto, Canada, Oct. 7-10, 1991.

English language abstract of DE 19858025; Publication Date: Jun. 21, 2000; Applicant: Aslgawo GmbH.

Tosa Shin'Ichi, et al., "The Development of Converter Canning Technology for Thin Wall Substrate." Honda R&D Tech. Rev., vol. 12, No. 1, pp. 175-182, Japan (2000).

Product Brochure—"There's More to it Than You Think. HDK—Pyrogenic Silica", Wacker Silicones, 6173/10.05/e, Oct. 2005.

Technical Data Sheet—"HDK N20 Pyrogenic Silica", Wacker Silicones, Version 1.0, Jun. 12, 2008.

Product Information—"MICROSIL Microporous Insulation", Zircon Ceramics, available at http://www.zircarceramics.com/pages/microporousinsulation/microporous.htm (last accessed Mar. 5, 2007—no longer accessible).

U.S. Appl. No. 12/200,083, filed Aug. 28, 2008.

International Search Report, Form PCT/ISA/210, for PCT International Patent Application No. PCT/US2008/010178 corresponding to U.S. Appl. No. 12/200,083, mailing date Sep. 4, 2009.

International Written Opinion of the International Searching Authority, form PCT/ISA/237, for PCT International Patent Application No. PCT/US2008/010178 corresponding to U.S. Appl. No. 12/200,083, mailing date Sep. 4, 2009.

WDS—tm Flexible contour POREXTHERM—Product data sheet Feb. 2008, pp. 1-3, XP002521853.

Title: "Multiple Layer Substrate Support and Exhaust Gas Treatment Device", U.S. Appl. No. 12/855,421, filed Aug. 12, 2010, Inventor: Kumar, Amit, et al.

International Search Report, Form PCT/ISA/210 and Written Opinion, Form PCT/ISA/237 for PCT International Patent Application No. PCT/US2010/002221.

Office Action from the United States Patent and Trademark Office, mailing date Feb. 8, 2011, for U.S. Appl. No. 12/200,083.

International Search Report, Form PCT/ISA/210, for PCT International Patent Application No. PCT/US2010/002226 corresponding to U.S. Appl. No. 12/855,455.

International Written Opinion, Form PCT/ISA/237, for PCT International Patent Application No. PCT/US2010/002226 corresponding to U.S. Appl. No. 12/855,455.

Office Action from the Japanese Patent Office issued Sep. 16, 2012 for Japanese Patent Application No. 2010-522948.

\* cited by examiner

MOUNTING MAT FOR EXHAUST GAS TREATMENT DEVICE

This application claims the benefit of the filing date, under 35 U.S.C. §119(e), of U.S. Provisional Application Patent Ser. No. 61/234,026, filed on Aug. 14, 2009, which application is incorporated herein by reference.

Disclosed is a mat or molded pre-form for use in an exhaust gas treatment device, such as catalytic converters and diesel particulate traps that are used in automotive exhaust systems. The mat or pre-form may be used as a mounting mat to mount a fragile monolith within an outer housing of an exhaust gas treatment device or as thermal insulation in end cone regions of the exhaust gas treatment device.

Exhaust gas treatment devices are used on automobiles to reduce atmospheric pollution from engine emissions. Examples of widely used exhaust gas treatment devices include catalytic converters and diesel particulate traps, selective catalyst reduction units, $NO_x$ traps, and the like.

A catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliently hold the fragile catalyst support structure within the housing.

A diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing.

The materials comprising fragile catalyst support structures are commonly frangible or brittle materials exhibiting a high heat resistance, a low thermal expansion coefficient, and a low impact resistance. The fragile catalyst support structure typically comprises a monolithic structure manufactured from a frangible material of metal or a brittle, ceramic material such as aluminum oxide, silicon dioxide, magnesium oxide, zirconia, cordierite, silicon carbide and the like. These materials provide a skeleton type of structure with a plurality of gas flow channels. These monolithic structures can be so fragile that even small shock loads or stresses are often sufficient to crack or crush them. In order to protect the fragile structure from thermal and mechanical shock and other stresses noted above, as well as to provide thermal insulation and a gas seal, a mounting mat is positioned within the gap between the fragile structure and the housing.

The geometry comprising substrates typically promotes a high surface area to volume ratio. The substrate geometry may comprise a plurality of elements which are thin and fragile. Without limitation, a common geometry for substrates is a monolith comprising an array of hollow rectangular prism cells defining tiny flow channels, separated by thin, fragile walls, such as in a honeycomb-type configuration.

Together, the geometric and material considerations for substrates commonly result in a substrate which is susceptible to impact, crushing, or other mechanical failure from small shockloads or stress, and which operates at very high temperatures. To address the problem of the fragile nature of the substrate, it is common to protect the substrate within a housing, typically a metallic housing, with a space or gap between the external surface of the substrate and the internal surface of the housing. In order to protect the substrate from thermal and mechanical shock and other stresses, as well as to provide thermal insulation, it is known to position at least one sheet of mounting material within the gap between the substrate and the housing.

Because exhaust gas treatment devices are designed to operate at temperatures substantially higher than ambient temperatures and are designed to cool to ambient temperatures when not operating, exhaust gas treatment devices are designed to undergo significant temperature fluctuations. The mounting of the substrate is designed to protect the substrate over the entire range of temperatures to which the device is exposed; from ambient through operating temperatures. The temperature fluctuations present a considerable challenge in designing the substrate mounting system.

A common means of mounting the substrate comprises inclusion of an insulating mounting mat between the substrate and the metallic housing. The mounting mat may be wrapped about the substrate and may be compressed by enclosing the housing around it. The level of compression is selected to provide an engagement force between the housing and the mat; and, the mat and the substrate, which produces mounting or holding forces both sufficiently high to secure the substrate with respect to the housing, and sufficiently low to avoid damage to the substrate. Also, a mounting mat will inherently have some resistance to heat flow and, in certain embodiments is a good insulator; the mat resists propagation of heat from the substrate to the housing and thereby lowers the steady state operating temperature of the housing for a given steady state operating temperature of the substrate.

Selection of a type of mounting material and the ambient temperature compression load to which to subject the mounting material to yield acceptable mounting or holding forces at all temperatures that the exhaust gas treatment device experiences continues to be a source of difficulty. Compounding this difficulty is the need for an insulative material between the substrate and the housing having a low thermal conductivity but which will not add undesirable weight or bulk to the device.

Microporous silica mats are known thermal insulators. However, microporous silica mats may lose the ability to function as a thermal insulator if the exhaust gas treatment device is exposed to water, which is often present in the form of condensate within an exhaust system. Exposing the insulative material to water causes the insulative material to lose its ability to insulate, thereby turning the insulative material into an insulation which is not significantly better than the support mat.

DESCRIPTION

Provided is a mounting mat comprising a single or multiple layer mat comprising microporous insulating material and a flexible fibrous material layer, wherein the microporous insulating material is shielded from exposure to liquid or liquid vapor.

An exhaust gas treatment device is also provided, said device comprising a housing; a fragile structure located within the housing; and a mounting mat disposed between said housing and said fragile structure, said mounting mat comprising a single or multiple layer mat comprising microporous insulating material and a flexible fibrous material, wherein the microporous insulating material is shielded from exposure to liquid or liquid vapor.

Also provided is a multiple layer mounting mat comprising a first layer comprising a non-intumescent sheet of inorganic fibers having a first major surface and a second major surface opposite the first major surface and an outer perimeter; a second layer comprising a non-intumescent sheet of inorganic fibers having a first major surface and a second major surface opposite the first major surface and an outer perimeter; a microporous inorganic insulating layer sealed entirely within the perimeters of said first non-intumescent layer and second non-intumescent layer.

An exhaust gas treatment device is also provided, said device comprising a housing; a fragile structure located within the housing; and a mounting mat disposed between said housing and said fragile structure, said mounting mat comprising a first layer comprising a non-intumescent sheet of inorganic fibers having a first major surface and a second major surface opposite the first major surface and an outer perimeter; a second layer comprising a non-intumescent sheet of inorganic fibers having a first major surface and a second major surface opposite the first major surface and an outer perimeter; a microporous inorganic insulating layer sealed entirely within the perimeters of said first non-intumescent layer and second non-intumescent layer.

Additionally provided is a multiple layer mounting mat comprising a first layer comprising an intumescent sheet of inorganic fibers having a first major surface and a second major surface opposite the first major surface and an outer perimeter; a second layer comprising an intumescent sheet of inorganic fibers having a first major surface and a second major surface opposite the first major surface and an outer perimeter; a microporous inorganic insulating layer sealed entirely within the perimeters of said first intumescent layer and second intumescent layer.

An exhaust gas treatment device is also provided, said device comprising a housing; a fragile structure located within the housing; and a mounting mat disposed between said housing and said fragile structure, said mounting mat comprising a first layer comprising an intumescent sheet of inorganic fibers having a first major surface and a second major surface opposite the first major surface and an outer perimeter; a second layer comprising an intumescent sheet of inorganic fibers having a first major surface and a second major surface opposite the first major surface and an outer perimeter; a microporous inorganic insulating layer sealed entirely within the perimeters of said first intumescent layer and second intumescent layer.

Further provided is a multiple layer mounting mat comprising a first layer comprising a non-intumescent sheet of inorganic fibers having a first major surface and a second major surface opposite the first major surface and an outer perimeter; a second layer comprising a non-intumescent sheet of inorganic fibers having a first major surface and a second major surface opposite the first major surface and an outer perimeter; a microporous inorganic insulating layer having an outer perimeter that is substantially coextensive with the outer perimeters of said first non-intumescent layer and second non-intumescent layer, wherein the said microporous inorganic insulation layer is positioned between said first and second non-intumescent layers and wherein edges of the microporous inorganic insulation mat are coated with a hydrophobic coating. Further, the major surfaces of the microporous inorganic insulation layer may be at least partially coated with a hydrophobic coating prior to positioning the microporous inorganic insulation layer between the first and second layers.

An exhaust gas treatment device is also provided, said device comprising a housing; a fragile structure located within the housing; and a mounting mat disposed between said housing and said fragile structure, said mounting mat comprising a first layer comprising a non-intumescent sheet of inorganic fibers having a first major surface and a second major surface opposite the first major surface and an outer perimeter; a second layer comprising a non-intumescent sheet of inorganic fibers having a first major surface and a second major surface opposite the first major surface and an outer perimeter; a microporous inorganic insulating layer having an outer perimeter that is substantially coextensive with the outer perimeters of said first non-intumescent layer and second non-intumescent layer, wherein the said microporous inorganic insulation layer is positioned between said first and second non-intumescent layers and wherein edges of the microporous inorganic insulation mat are coated with a hydrophobic coating. Further, the major surfaces of the microporous inorganic insulation layer may be at least partially coated with a hydrophobic coating prior to positioning the microporous inorganic insulation layer between the first and second layers.

Further provided is a multiple layer mounting mat comprising a first layer comprising an intumescent sheet of inorganic fibers having a first major surface and a second major surface opposite the first major surface and an outer perimeter; a second layer comprising an intumescent sheet of inorganic fibers having a first major surface and a second major surface opposite the first major surface and an outer perimeter; a microporous inorganic insulating layer having an outer perimeter that is substantially coextensive with the outer perimeters of said first intumescent layer and second intumescent layer, wherein the said microporous inorganic insulation layer is positioned between said first and second intumescent layers and wherein edges of the microporous inorganic insulation mat are coated with a hydrophobic coating. Further, the major surfaces of the microporous inorganic insulation layer may be at least partially coated with a hydrophobic coating prior to positioning the microporous inorganic insulation layer between the first and second layers.

An exhaust gas treatment device is also provided, said device comprising a housing; a fragile structure located within the housing; and a mounting mat disposed between said housing and said fragile structure, said mounting mat comprising a first layer comprising an intumescent sheet of inorganic fibers having a first major surface and a second major surface opposite the first major surface and an outer perimeter; a second layer comprising an intumescent sheet of inorganic fibers having a first major surface and a second major surface opposite the first major surface and an outer perimeter; a microporous inorganic insulating layer having an outer perimeter that is substantially coextensive with the outer perimeters of said first intumescent layer and second intumescent layer, wherein the said microporous inorganic insulation layer is positioned between said first and second intumescent layers and wherein edges of the microporous inorganic insulation mat are coated with a hydrophobic coating. Further, the major surfaces of the microporous inorganic insulation layer may be at least partially coated with a hydrophobic coating prior to positioning the microporous inorganic insulation layer between the first and second layers.

Further provided is a multiple layer mounting mat comprising a first layer comprising a non-intumescent sheet of inorganic fibers having a first major surface and a second major surface opposite the first major surface and an outer perimeter; and a microporous inorganic insulating layer having a first major surface and a second major surface opposite said first major surface and an outer perimeter that is substantially coextensive with the outer perimeter of said non-intumescent layer, wherein one of said first or second major surfaces and lateral edges of the microporous inorganic insulation mat are coated with a hydrophobic coating. Further, the un-coated major surface of the microporous insulation layer may be at least partially coated with a hydrophobic coating prior to constructing the multiple layer mounting mat.

An exhaust gas treatment device is also provided, said device comprising a housing; a fragile structure located within the housing; and a mounting mat disposed between said housing and said fragile structure, said mounting mat comprising a first layer comprising a non-intumescent sheet of inorganic fibers having a first major surface and a second major surface opposite the first major surface and an outer perimeter; and a microporous inorganic insulating layer having a first major surface and a second major surface opposite said first major surface and an outer perimeter that is substantially coextensive with the outer perimeter of said non-intumescent layer, wherein one of said first or second major surfaces and lateral edges of the microporous inorganic insulation mat are coated with a hydrophobic coating. Further, the un-coated major surface of the microporous insulation layer may be at least partially coated with a hydrophobic coating prior to constructing the multiple layer mounting mat.

Yet still provided is a multiple layer mounting mat comprising a first layer comprising an intumescent layer of inorganic fibers having a first major surface and a second major surface opposite the first major surface and an outer perimeter; and a microporous inorganic insulating layer having a first major surface and a second major surface opposite said first major surface and an outer perimeter that is substantially coextensive with the outer perimeter of said intumescent layer, wherein one of said first or second major surfaces and lateral edges of the microporous inorganic insulation mat are coated with a hydrophobic coating. Further, the un-coated major surface of the microporous insulation layer may be at least partially coated with a hydrophobic coating prior to constructing the multiple layer mounting mat.

An exhaust gas treatment device is also provided, said device comprising a housing; a fragile structure located within the housing; and a mounting mat disposed between said housing and said fragile structure, said mounting mat comprising a first layer comprising an intumescent layer of inorganic fibers having a first major surface and a second major surface opposite the first major surface and an outer perimeter; and a microporous inorganic insulating layer having a first major surface and a second major surface opposite said first major surface and an outer perimeter that is substantially coextensive with the outer perimeter of said intumescent layer, wherein one of said first or second major surfaces and lateral edges of the microporous inorganic insulation mat are coated with a hydrophobic coating. Further, the un-coated major surface of the microporous insulation layer may be at least partially coated with a hydrophobic coating prior to constructing the multiple layer mounting mat.

Further provided is a mounting mat comprising a layer of inorganic fibrous material having a first major surface, a second major surface opposite said first major surface and a thickness extending between said first and second major surfaces; a cavity formed in a portion of said layer thickness; and an insert of microporous inorganic insulation material disposed within said cavity.

An exhaust gas treatment device is also provided, said device comprising a housing; a fragile structure located within the housing; and a mounting mat disposed between said housing and said fragile structure, said mounting mat comprising a layer of inorganic fibrous material having a first major surface, a second major surface opposite said first major surface and a thickness extending between said first and second major surfaces; a cavity formed in a portion of said layer thickness; and an insert of microporous inorganic insulation material disposed within said cavity. Further, the insert of microporous inorganic insulation material may be at least partially coated with a hydrophobic coating prior to being inserted into the cavity.

Further provided is a single or multiple layer mounting mat comprising microporous inorganic insulating material and a flexible fibrous material, wherein the microporous inorganic insulating material is shielded from exposure to liquid or liquid vapor.

Provided is a mat or molded pre-from for mounting a fragile substrate within a housing of an exhaust gas treatment device. The mat or pre-form includes a microporous insulation material component and another different material component, such as a flexible fibrous material component. The mat may be positioned between the exterior surface of a fragile catalyst support structure, such as a fragile monolithic substrate, and the inner surfaces of the housing in the exhaust gas treatment device.

The insulative layer of the substrate mounting system promotes the insulative character of the material between the substrate and the housing and thereby decreases the steady state operating temperature of the housing and other materials external to the insulative layer for a given steady state operating temperature of the substrate. In such embodiments, the insulation reduces the thermal strain which the materials external to the insulative layer undergo, mitigating changes in the mounting or holding forces to which the substrate is subjected. In some embodiments, the insulative layer insulates the mat from the substrate and thereby decreases the operating temperature of the mat for a given operating temperature of the substrate. In such embodiments, the thermal strain which the mat undergoes is reduced, reducing changes in the mounting or holding forces to which the substrate is subjected. In other embodiments, the insulative layer is positioned between the mat and the housing and thereby decreases the surface temperature of the housing for a given operating temperature of the substrate. In such embodiments, the thermal strain which the housing undergoes is reduced, reducing changes in the mounting or holding forces to which the substrate is subjected.

The exhaust gas treatment device generally comprises a fragile catalyst support substrate (which may also be referred to as a fragile substrate or fragile monolith), an outer housing, and a mounting mating mat positioned between the fragile catalyst support structure and the outer housing.

A substrate is a component in an exhaust gas treatment device which modifies exhaust material. There are many kinds of exhaust gas treatment devices which may comprise a substrate. One type of exhaust gas treatment device is a catalytic converter. The active portion of a catalytic converter comprises a substrate that is coated or impregnated with a catalyst to promote oxidation of carbon monoxide and hydrocarbons and the reduction of oxides of nitrogen, eliminating undesired products of combustion in the exhaust stream.

Monoliths are typically oval or round in cross-sectional configuration, but other shapes are possible. The substrate is spaced from its housing by a gap width distance which will vary according to the type and design of the device utilized, for example, a catalytic converter, a diesel catalyst structure, or a diesel particulate trap. In some embodiments, the gap can be at least about 0.05 inch (1.27 mm), and in other embodiments the gap can be up to one inch (25.4 mm) or more. This gap width may typically range from about 3 mm to about 25 mm with a range of about 3 mm to about 8 mm being commercially common widths. The mounting mat is disposed in this space to provide both thermal insulation to the external environment and mechanical support to the ceramic monolith, protecting the substrate from damage due to mechanical shock.

A diesel particulate filter is another type of exhaust gas treatment device. The active portion of a diesel particulate filter comprises a substrate acting as a filter. A diesel particulate trap may include one or more porous tubular or honeycomb-like structures (having channels closed at one end, however), which are mounted by a thermally resistant material within a housing. Particulate is collected from exhaust gases in the porous structure, typically until regenerated by a high temperature burnout process.

Another type of exhaust gas treatment device is a selective catalyst reduction unit. The active portion of a selective catalyst reduction unit comprises a substrate, coated with a catalyst to promote chemical reduction and elimination of undesired products in the exhaust stream.

A further type of exhaust gas treatment device is a $NO_x$ trap. The active portion of a $NO_x$ trap comprises a catalytic substrate comprising alkali or alkaline earth materials. The trap operates in a cyclic manner; cycling between a "sorbtion" process and a "regeneration" process. During sorbtion the substrate intakes $NO_x$ species and traps them on the surface of the catalytic substrate as nitrate species. During regeneration, a reducing material is introduced into the $NO_x$ trap and the nitrate species are removed from the substrate and reduced to nitrogen.

Non-automotive applications for the subject mounting system include but are not limited to catalytic converters for chemical industry emission (exhaust) stacks.

In an exhaust gas treatment device, the substrate may operate at temperatures substantially above ambient temperature. Without limitation, the operating temperature for certain embodiments of exhaust gas treatment devices is in the range from ambient to about 1000° C. Because of the substantially elevated temperatures at which it operates, the substrate typically comprises materials having excellent resistance to heat, a very high melting point, and very low thermal expansion coefficient. There are many materials which have these properties including a wide variety of ceramics, tungsten, rhenium, and more exotic materials. One group of very common materials which exhibit excellent resistance to heat is ceramics. Exhaust gas treatment device substrates typically comprise a frangible material, such as a monolithic structure formed of a brittle, fireproof ceramic material such as, but not limited to, aluminum oxide, silicon dioxide, magnesium oxide, zirconia, cordierite, silicon carbide and the like.

A housing is a hollow body which at least partially encloses the substrate. The housing protects the substrate from impact, torsion, tension, compression, or other mechanical loading which may damage the substrate. According to certain embodiments, the housing comprises a thin shell. The housing comprises materials having good resistance to heat, ie, a high melting point and high heat resistance. The materials comprising exhaust gas treatment device housings are commonly ductile materials comprising a lower heat resistance than the monolith, a higher thermal expansion coefficient than the monolith, and a higher impact resistance than the monolith. Without limitation, in certain embodiments the exhaust gas treatment device housing comprises a metal or metal alloy, such as high temperature-resistant steel.

The mounting mat comprises a microporous inorganic insulating material and a flexible fibrous material, which are combined in a manner to protect the insulating layer from exposure to liquid, liquid condensate, and liquid vapor that is often present in an exhaust system. The insulating material and the flexible fibrous material may be combined in a variety of ways to prepare a hybrid mounting mat and a variety of techniques may be employed to achieve a combination that protects the insulating material from exposure to liquid or liquid vapor.

According to certain embodiments, the insulating layer may be embedded within a portion of the thickness of a mat of flexible fibrous material to form a hybrid mat. Embedding the insulating layer within the mat of flexible fibrous material limits the insulating layer's exposure to water or condensate that may form in an exhaust pipe. Rather than saturating an exposed insulating layer, any water or condensate that may form in this area of an exhaust system would be in direct contact with the fibrous mat. Thus, any water or condensate that may form within the exhaust system would be adsorbed by the fibrous mat and evaporated out by the high operating temperatures of the exhaust gas treatment device without reaching the insulating layer.

Various methods may be employed to embed the microporous inorganic insulating layer within the flexible fibrous mat in order to protect the insulating layer from exposure to water. According to certain embodiments, an area the size of the insulating layer may be removed from the thickness of the flexible fibrous mat to form a cavity within the mat. Without limitation, and only by way of illustration, a suitable area that may be removed from the mat is typically 90×40 mm. Considering that mat thickness is typically about 10 mm, the depth of the material removed must be less than about 10 mm. The insulating layer is shaped to fit into the cavity formed from the removal of the fibrous material from the flexible mat.

According to certain embodiments, a slot or frame may be formed within the cavity for installation of the insulating layer. The thickness of the insulating layer is generally smaller than the depth of the cavity to allow for the placement of additional flexible fibrous material over the insulating layer within the cavity. Additional mat material may be cut to an area corresponding to the perimeter of the cavity and to a depth corresponding to the remaining depth of the cavity after insertion of the insulating layer. This mat material may be placed over the insulating layer within the cavity causing the insulating layer to be completely embedded within the thickness of the flexible fibrous mat. Thus, the flexible fibrous mat isolates the microporous insulating layer from direct contact with the substrate and potential exposure to water or condensate. Further, the insulating layer may be at least partially coated with a hydrophobic coating prior to being embedded within the cavity of the flexible fibrous mat.

Alternatively, additional flexible fibrous mat material need not be placed over the insulating layer within the cavity. According to this embodiment, the insulating layer is cut to a depth smaller than that of the cavity and embedded within the cavity of the flexible fibrous mat. This embedding of the insulating layer may serve as sufficient protection against water or condensate within the exhaust system. The material may be removed from the fibrous mat by cutting away a desired amount of material from the thickness of the mat. Alternatively, a mat may be die cut or die stamped to have a cavity in its thickness. Further, the insulating layer may be at least partially coated with a hydrophobic coating prior to being embedded within the cavity of the flexible fibrous mat.

An alternative method of embedding at least one microporous insulating layer within the flexible fibrous layer is to locate the insulating layer between two layers of different material, such as two layers of flexible fibrous material and sealing the at least one microporous insulating layer between the at least two flexible fibrous material layers. Sealing may be accomplished through heat sealing and pressure or other means. The sealing method may be applied to the entire surface of the flexible fibrous material layers and insulating layer of the substrate support system or portions of the surface of the flexible fibrous material layers and insulating layer combination.

Alternatively, the sealing method may be applied to the outer edge or perimeter of the flexible fibrous material layers and microporous insulating layer of the substrate support system.

A further alternative method to embedding the insulating layer within the substrate mounting system is to apply an adhesive on the edges or outer perimeter of either the insulating layer or the mounting mat followed by fitting or pressing the insulating and flexible fibrous layer together. The adhesive applied in this method may be a hydrophobic coating or paste and functions as a sealant against water or condensation that may enter the substrate mounting system.

The insulating layer as described above is a layer of material characterized by a low thermal conductivity. As with any other design process, during design of an exhaust gas treatment device, considerations of weight savings and space savings must be balanced against cost considerations. Materials which exhibit low density or low bulk and take up little space are desirable. In certain embodiments, the insulating layer exhibits both low density and low bulk. In certain embodiments, the stiffness of the insulating layer is between 3 MPa and 5 MPa for strains less than 0.1. For example, at strains less than 0.1, the insulating layer WDS® Flexible Contour (from Porextherm GmbH of Kempten, Germany) has a modulus of approximately 4 MPa, compared to the mounting mat alone having a modulus approaching zero (0) and the combined mounting system also having a modulus approaching zero (0).

Mounting support systems provide engagement forces which are developed by compression of the materials comprising the support system. While many materials are compressible, only materials which are compressible and are substantially elastic can return the energy thereby imparted to them to the system as an engagement force. Non-stiff materials will undergo large strains at low stresses and incorporate the energy causing the strain, the strain energy. Non-stiff, substantially elastic materials, will undergo large strains at low stresses, incorporate the strain energy, and return a substantial portion of the strain energy as a restoring force. This restoring force contributes to the mounting or holding force. Stiff materials will undergo small strains, at low stresses and incorporate the strain energy. Stiff, substantially elastic materials, will undergo small strains at low stresses, incorporate the strain energy, and return a substantial portion of the strain energy as a restoring force.

A subject mounting system incorporates one or more layers of material, all mechanically loaded at once such that all layers experience substantially identical stress. This kind of loading is "series loading". In series loading, non-stiff layers will undergo greater strain and therefore incorporate greater strain energy than will the stiffer layers. Because there is a positive correlation between the amount of strain energy incorporated into a material during a given loading cycle and the hysteretic erosion of the material, stiffer materials may be protected from certain kinds of erosion by incorporating them in series with a non-stiff material. In certain embodiments a stiff insulating layer (relative to the mounting mat) is incorporated into the mounting system in series with a non-stiff mounting mat.

The insulating layer may include at least material from a class of materials available as thin, somewhat flexible sheets which exhibit low thermal conductivity and are substantially non-intumescent. In certain embodiments the insulating layer is a microporous inorganic insulation layer comprising a thin, flexible sheet exhibiting extremely low thermal conductivity.

Such microporous inorganic insulation is available as thin, flexible sheets having a thermal conductivity at 20° C. and at a density of about 350 kg/m$^3$ of less than about 0.021 W/mK. In certain embodiments the insulating layer is a microporous insulation comprising a thin, flexible sheet exhibiting a thermal conductivity at 20° C. and at about 350 kg/m$^3$ of less than about 0.021 W/mK, and having a thermal conductivity less than 0.055 W/mK for temperatures less than about 1000° C.

In certain embodiments the insulating layer is a microporous inorganic insulation comprising a thin, flexible sheets exhibiting a thermal conductivity at 20° C. and at a density of about 350 kg/m$^3$ of less than about 0.021 W/mK, and a thermal conductivity less than 0.055 W/mK for temperatures less than 1000° C., having a bulk density between about 260 kg/m$^3$ and about 520 kg/m$^3$. Microporous inorganic insulation having a greater density may be acceptable if sufficiently flexible to wrap around and conform to the outer surface of the substrate. In certain embodiments the insulating layer having these properties is available as thin, flexible sheets having a thickness between about 3 mm and about 20 mm.

In certain embodiments the insulating layer is substantially incompressible. One type of microporous inorganic insulation exhibits the compression performance shown in TABLE I at a density of about 350 kg/m$^3$. In TABLE I, the listed pressures are those required to compress the material by the listed percentages at the listed temperatures.

TABLE I

| Compression | 20° C. | 400° C. | 800° C. |
|---|---|---|---|
| 1% | 0.034 MPa | 0.028 MPa | 0.028 MPa |
| 3% | 0.089 MPa | 0.083 MPa | 0.110 MPa |
| 5% | 0.151 MPa | 0.144 MPa | 0.165 MPa |
| 10% | 0.275 MPa | 0.295 MPa | 0.350 MPa |

The microporous inorganic insulating layer comprises finely divided metal oxide and an opacifier, that is, a material that minimizes infra-red radiation; and optionally further comprises reinforcing inorganic fiber, such as glass filaments. The inorganic insulating layer, in its pre-installed form, may be sealed in a polymeric film, such as polyethylene, although the film may be selected for economy and functionality rather than composition. It is also possible that a minor amount of organic fibers or particles may be incorporated into the microporous insulating layer for processing considerations.

The finely divided metal oxide may comprise at least one of pyrogenic silicas, arc silicas, low-alkali precipitated silicas, silicon dioxide aerogels, aluminum oxides similarly prepared, and mixtures thereof. In one embodiment, the finely divided metal oxide comprises fumed silica. The finely divided metal oxide may have a specific BET surface area of from about 50 to about 700 m$^2$/g, in particular from about 70 to about 400 m$^2$/g.

The particle sizes of the materials in the microporous insulating layer are small enough that mechanisms of heat transfer are controlled. The particulate and fibrous material are sized to create pores which are less than about 0.1 microns in diameter, less than the mean free path of air. By limiting the quantity and motion of air in the pores, both conduction due to air and convection heat transfer is limited, thus reducing thermal conductivity.

The opacifier may comprise at least one of ilmenite, titanium dioxide, iron(II)/iron(III) mixed oxides, chromium dioxide, zirconium oxide, manganese dioxide, iron oxide, rutile, zirconium silicate, silicon carbide, and mixtures thereof. The opacifier may have a particle size less than about 15 microns, in certain embodiments, in the range from about 0.1 to about 10 microns.

The reinforcing fiber of the insulation layer may comprise a broad family of materials. The family of materials includes any inorganic fiber capable of providing the structure necessary to retain the microporous particles in a cohesive unit. According to certain embodiments, the reinforcing fiber is selected from the group consisting of aluminum silicate, magnesium silicate, rockwool, or combinations thereof. In certain embodiments, reinforcing fiber of the insulation layer may comprise at least one of textile glass fibers or quartz fibers, such as high-temperature-resistant fibers having an SiO$_2$ content of greater than 60% by weight, and in some embodiments greater than 90% by weight, silica fibers, textile fibers made from R glass, textile fibers made from S2 glass, textile fibers made from ECR glass, and fibers made from aluminum silicate. The fiber diameter may be greater than about 1.5 microns.

An insulating sheet commercially available from Porextherm GmbH (Kempten, Germany), comprises 55 weight % of HDK N25 highly dispersed silica (BET 280 m$^2$/g), 40 weight % of zirconium silicate, 5% of textile glass fibers (silicon content>92%) having a density of 320 kg/m$^3$ and a thickness of 10 mm. This sheet is substantially incompressible.

Another such microporous inorganic insulating material is WDS® Flexible Contour insulation, available from Porextherm GmbH (Kempten, Germany). WDS® Flexible Contour microporous insulation (WDS) is an exemplative material comprising about 50% silica, about 45% zirconium silicate, and about 5% of other materials, including reinforcing glass fibers, which may be used as an insulating layer that exhibits the low thermal conductivity discussed above in a low density, thin material. Without limitation, WDS® Flexible Contour is commercially produced in 3 mm, 5 mm, 7 mm, 10 mm, and 20 mm thicknesses. Similar microporous insulation material is available from Microtherm (Alcoa, Tenn.).

The flexible fibrous material layer is a substantially elastic, compressible material layer. The mounting mat is subject to heating by the substrate, and at least indirectly by the exhaust gases, and therefore may also operate at temperatures above ambient temperatures. The flexible fibrous material layer typically comprises materials able to withstand elevated temperature environments while remaining substantially elastic and compressible. The flexible fibrous material layer may comprise materials ranging from relatively inexpensive materials such as, for example, amorphous glass fibers such as S-glass, to more expensive materials such as, for example, high alumina ceramic oxide fibers. Intumescent materials as well as non-intumescent materials have been and continue to be employed in mounting mats, depending upon the application and conditions under which the flexible fibrous material layers are to be used.

The flexible fibrous material layer may engage the substrate, either indirectly through an intermediate component, or directly, and substantially immobilizes it with respect to the housing. At least one flexible fibrous material layer may be disposed in the exhaust gas treatment device between the housing and the substrate. The installed flexible fibrous material layer is compressed such that it imparts a load, either indirectly through an intermediate component or directly, on the housing and the substrate. As noted above, the amount of the compressive load is substantially proportional to the amount of compression. A friction force resulting from the normal force is also substantially proportional to the amount of compression. These forces, the compression force and the friction force, together or separately, substantially immobilize the substrate with respect to the housing. By "substantially immobilize" it is meant that the amount that the substrate may move with respect to the housing is very small, on the order of the largest elastic strain limit of the materials providing holding forces. In certain embodiments, the largest elastic strain limit of the materials providing holding forces is about 1% of the material thickness. In certain embodiments at least one mounting mat is wrapped around the substrate and, optionally, other layers are wrapped around the substrate, and are compressed by the housing to provide a holding force on the substrate.

The term "flexible fibrous material layer" means at least one sheet or layer primarily comprising high temperature resistant fiber, such as but not limited to ceramic fiber, and optionally including either within said at least one sheet or layer, or in an additional sheet or layer, intumescent material, reinforcing material, and the like. The high temperature resistant fiber, or ceramic fiber, sheet or layer may be in various forms such as paper, blanket, mat or felt, provided such form imparts the necessary thermal insulation and mechanical support.

In certain embodiments, the flexible fibrous material layer may comprise Fiberfrax® paper available from Unifrax I LLC, Niagara Falls, N.Y. This product is made from bulk alumino-silicate glassy fiber having approximately 50/50 alumina/silica and a 70/30 fiber/shot ratio. About 93 weight percent of this paper product is ceramic fiber/shot, the remaining 7 percent being in the form of an organic latex binder. For higher substrate monolith temperatures, papers produced from Fibermax® polycrystalline mullite ceramic fibers available from Unifrax or alumina fibers may be employed. Other ceramic fibers that may be used include those formed from basalt, industrial smelting slags, alumina, zirconia, zirconia-silicates, alumino-silicates and chrome, zircon and calcium modified alumino-silicates and the like.

The flexible fibrous material layer may also include an intuenscent agent or material which expands in response to the application of heat to the material. The intumescent material may include at least one of unexpanded vermiculite, hydrobiotite, water-swelling tetrasilicic fluorine mica, alkaline metal silicates, or expandable graphite, and may be formed into a sheet using organic and/or inorganic binders to provide a desirable degree of wet strength. A sheet of intumescent material can be produced by standard paper making techniques as described, for example, in U.S. Pat. No. 3,458,329, the disclosure of which is incorporated herein by reference.

The flexible fibrous material layer may be produced in several different ways, including a conventional paper-making process, either hand laid or machine laid. A handsheet mold, a Fourdrinier paper machine, or a rotoformer paper machine can be employed to make the flexible fibrous material layer. In any case, a flocculated aqueous slurry containing a number of components, as set forth below, is pressed to remove most of the water, and the layer is then dried. This process is well known to those skilled in the art.

In other embodiments, the flexible fibrous mat or layer may comprise a substantially non-expanding composite sheet of high temperature resistant fibers and a binder. In certain embodiments, the flexible fibrous material layer is "integral", meaning that after manufacture the layer has self supporting structure, needing no reinforcing or containment layers of fabric, plastic or paper, (including those which are stitch-bonded to the mat) and can be handled or manipulated without disintegration. By "substantially non-expanding" is meant that the sheet does not readily expand upon the application of heat as would be expected with intumescent paper. Of course, some expansion of the sheet does occur based upon its thermal coefficient of expansion. The amount of expansion, however, is insubstantial as compared to the expansion which occurs based upon intumescent properties.

High temperature resistant fiber, including ceramic fibers which are useful in the non-flexible fibrous material layer include polycrystalline oxide ceramic fibers such as mullite, alumina, high alumina aluminosilicates, aluminosilicates, zirconia, titania, chromium oxide and the like. In certain embodiments, the fibers are refractory. When the ceramic fiber is an aluminosilicate, the fiber may contain between about 55 to about 98% alumina and between about 2 to about 45% silica, in certain embodiments with the ratio of alumina to silica being between 70 to 30 and 75 to 25. Suitable polycrystalline oxide refractory ceramic fibers and methods for producing the same are contained in U.S. Pat. Nos. 4,159,205 and 4,277,269, which are incorporated herein by reference. FIBERMAX® polycrystalline mullite ceramic fibers are available from Unifrax I LLC, Niagara Falls, N.Y. in blanket, mat or paper form. The fibers used in the flexible fibrous material layer may be substantially shot free, having very low shot content, generally on the order of about 5 percent nominally or less. The diameters of such fibers may be generally about 1 micron to about 10 microns.

The binder used in the flexible fibrous material layer is typically an organic binder which may be sacrificial in nature. By "sacrificial" is meant that the binder will eventually be burned out of the flexible fibrous material layer, leaving only the fibers as the final flexible fibrous material layer. Suitable binders include aqueous and nonaqueous binders, but often the binder utilized is a reactive, thermally setting latex which after cure is a flexible material that can be burned out of the installed mounting mat as indicated above. Examples of suitable binders or resins include, but are not limited to, aqueous based latexes of acrylics, styrene-butadiene, vinylpyridine, acrylonitrile, vinyl chloride, polyurethane and the like. Other resins include low temperature, flexible thermosetting resins such as unsaturated polyesters, epoxy resins and polyvinyl esters. Specific useful binders include but are not limited to HI-STRETCH V-60™, a trademark of B.F. Goodrich Co. (Akron, Ohio) for acrylonitrile based latex. Solvents for the binders can include water, or a suitable organic solvent, such as acetone, for the binder utilized. Solution strength of the binder in the solvent (if used) can be determined by conventional methods based on the binder loading desired and the workability of the binder system (viscosity, solids content, etc.).

Similarly, the flexible fibrous material layer can be prepared by conventional papermaking techniques. Using this process, the inorganic fibers are mixed with a binder to form a mixture or slurry. The slurry may then be diluted with water to enhance formation, and it may finally be flocculated with flocculating agent and drainage retention aid chemicals. Then, the flocculated mixture or slurry may be placed onto a papermaking machine to be formed into a ceramic paper mat. The mats or sheets may be formed by vacuum casting the slurry or mixture with conventional papermaking equipment and are typically dried in ovens.

Alternatively, the fibers may be processed into a mat by conventional means such as dry air laying. The mat at this stage, has very little structural integrity and is very thick relative to the conventional catalytic converter and diesel trap mounting mats. Where this alternative technique is used, the mat may be further processed by the addition of a binder to the mat by impregnation to form a discontinuous fiber composite. The binder is added after formation of the mat, rather than forming the mat prepreg as noted hereinabove with respect to the conventional papermaking technique.

In another embodiment, high index, crystallized, melt-formed refractory ceramic fibers are heat treated at temperatures above the mullite crystallization temperature of 980° C., such as temperatures ranging from 990° C. to about 1400° C. in a controlled manner to obtain specific amounts of crystallinity and crystallite size. In certain embodiments, such fibers will have at least about 5 to about 50 percent crystallinity as detected by x-ray diffraction, and a crystallite size of from about 50 Å to about 500 Å. When such fibers are employed, the mounting mat provides a minimum pressure for holding the fragile catalyst support structure within the housing. By way of illustration, the holding forces of such a mat may be at least one of i) at least 2 psi after at least 200 cycles and/or after 1000° C. of testing at 900° C. or ii) at least about 4 psi after at least 1000 cycles of testing at 750° C.

The ceramic fibers which are useful in this embodiment are melt-formed ceramic fibers containing alumina and silica, including but not limited to melt spun refractory ceramic fibers. These include aluminosilicates, such as those aluminosilicate fibers having from about 40 to about 60 percent alumina and from about 60 to about 40 percent silica, and some embodiments, from about 47 to about 53 percent alumina and from about 47 to about 53 percent silica. The melt-formed, spun fibers are of high purity chemically and may have an average diameter in the range of about 1 to about 14 and in certain embodiments, in the range of about 3 to 6.5 µm. The fibers are beneficiated as is well known in the art to obtain a greater than 90 percent fiber index, meaning they contain less than 10 percent shot, and often only about 5 percent shot.

In yet another embodiment, a flexible fibrous material layer for use in a low temperature exhaust gas treatment device may comprise high temperature resistant, amorphous, inorganic fibers, optionally a binder, and which have not been post-processed by heat treating. The fibers may have a use temperature up to about 1260° C., a Young's Modulus of less than about $20 \times 10^6$ psi, and a geometric mean diameter less than about 5 µm. The fibers may comprise at least one of an amorphous alumina/silica fiber, an alumina/silica/magnesia fiber (such as S-2 Glass from Owens Corning, Toledo, Ohio), mineral wool, E-glass fiber, magnesia-silica fibers, such as ISOFRAX® fibers from Unifrax I LLC, Niagara Falls, N.Y., or calcia-magnesia-silica fibers, such as INSULFRAX® fibers from Unifrax I LLC, Niagara Falls, N.Y. or SUPER-WOOL™ fibers from Thermal Ceramics Company. The alumina/silica fiber typically comprises from about 45% to about 60% $Al_2O_3$ and about 40% to about 55% $SiO_2$; and the fiber may comprise about 50% $Al_2O_3$ and about 50% $SiO_2$. The alumina/silica/magnesia glass fiber typically comprises from about 64% to about 66% $SiO_2$, from about 24% to about 25%

Al$_2$O$_3$, and from about 9% to about 10% MgO. The E-glass fiber typically comprises from about 52% to about 56% SiO$_2$, from about 16% to about 25% CaO, from about 12% to about 16% Al$_2$O$_3$, from about 5% to about 10% B$_2$O$_3$, up to about 5% MgO, up to about 2% of sodium oxide and potassium oxide and trace amounts of iron oxide and fluorides, with a typical composition of 55% SiO$_2$, 15% Al$_2$O$_3$, 7% B$_2$O$_3$, 3% MgO, 19% CaO and traces of the above mentioned materials.

According to other embodiments, the flexible fibrous material layer may comprise a layer, ply, or sheet of biosoluble inorganic fibers, such as alkaline earth silicate fibers. The term "biosoluble" inorganic fibers refer to inorganic fibers that are soluble or otherwise decomposable in a physiological medium or in a simulated physiological medium, such as simulated lung fluid. The solubility of the fibers may be evaluated by measuring the solubility of the fibers in a simulated physiological medium over time. A method for measuring the biosolubility (i.e. the non-durability) of the fibers in physiological media is disclosed U.S. Pat. No. 5,874,375 assigned to Unifrax, which is incorporated herein by reference. Other methods are suitable for evaluating the biosolubility of inorganic fibers. According to certain embodiments, the biosoluble fibers exhibit a solubility of at least 30 ng/cm$^2$-hr when exposed as a 0.1 g sample to a 0.3 ml/min flow of simulated lung fluid at 37° C. According to other embodiments, the biosoluble inorganic fibers may exhibit a solubility of at least 50 ng/cm$^2$-hr, or at least 100 ng/cm$^2$-hr, or at least 1000 ng/cm$^2$-hr when exposed as a 0.1 g sample to a 0.3 ml/min flow of simulated lung fluid at 37° C.

Without limitation, suitable examples of biosoluble inorganic fibers that can be used to prepare a mounting mat for an exhaust gas treatment device include those biosoluble inorganic fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, each of which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia, 0 to about 7 weight percent zirconia and 5 weight percent or less impurities. According to other embodiments, the alkaline earth silicate fibers comprise the fiberization product of about 70 to about 86 weight percent silica, about 14 to about 30 weight percent magnesia, and 5 weight percent or less impurities. More information on magnesia-silica fibers can be found in U.S. Pat. No. 5,874,375.

A suitable magnesium-silicate fiber is commercially available from Unifrax I LLC (Niagara Falls, N.Y.) under the registered trademark ISOFRAX. Commercially available ISOFRAX fibers generally comprise the fiberization product of about 70 to about 80 weight percent silica, about 18 to about 27 weight percent magnesia and 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silicate fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and 10 weight percent or less impurities. Typically, biosoluble calcia-magnesia-silica fibers comprise about 15% to about 35% CaO, about 2.5% to about 20% MgO, and about 60 to about 70% SiO$_2$.

Useful calcia-magnesia-silicate fibers are commercially available from Unifrax I LLC (Niagara Falls, N.Y.) under the registered trademark INSULFRAX. INSULFRAX fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL 607 and SUPERWOOL 607 MAX. SUPERWOOL 607 fibers comprise about 60 to about 70 weight percent silica, from about 25 to about 35 weight percent calcia, and from about 4 to about 7 weight percent magnesia, and trace amounts of alumina. SUPERWOOL 607 MAX fibers comprise about 60 to about 70 weight percent silica, from about 16 to about 22 weight percent calcia, and from about 12 to about 19 weight percent magnesia, and trace amounts of alumina.

The biosoluble fibers are typically amorphous inorganic or glass fibers that may be melt-formed, are fibers of high chemical purity (greater than about 98%) and may have an average diameter in the range of about 1 to about 10 μm, and in certain embodiments, in the range of about 2 to 4 μm. While not specifically required, the fibers may be beneficiated, as is well known in the art.

The flexible fibrous material layer may comprise up to 100 weight percent of the biosoluble inorganic fibers. The biosoluble inorganic fibers may be used to prepare both intumescent and non-intumescent flexible fibrous material layers for exhaust gas treatment devices, such as catalytic converters and diesel particulate traps. According to alternative embodiments, the flexible fibrous material layer may include at least 25, 50, 75, 85 or 95 weight percent of the biosoluble inorganic fibers, based upon 100 percent of the total flexible fibrous material layer weight. According to certain illustrative embodiments, the flexible fibrous material layer comprises about 25 to about 100 weight percent alkaline earth silicate fibers, based upon 100 weight percent of the total flexible fibrous material layer weight. The flexible fibrous material layer may alternatively comprise about 50 to about 100 weight percent alkaline earth silicate fibers, based upon 100 weight percent of the total flexible fibrous material layer weight. According to one embodiment, the flexible fibrous material layer comprises about 66 weight percent alkaline earth silicate fibers, based upon 100 weight percent of the total flexible fibrous material layer weight.

According to other embodiments, however, the mat may optionally comprise other fibers such as high alumina polycrystalline fibers, refractory ceramic fibers such as aluminosilicate fibers, silica fibers, S-glass fibers, S2 glass fibers, E glass, or other ceramic or glass fibers suitable for use in the production of mounting mats for the particular temperature applications desired. Such fibers may be added to the mounting mat in quantities of from greater than 0 to about 50 percent by weight, based upon 100 percent by weight of the total mat.

In certain embodiments, the flexible fibrous material layer comprises one or more non-intumescent plies of melt-formed, amorphous, high-temperature resistant leached glass fibers having a high silica content and, optionally, includes a binder or other fibers suitable for acting as a binder. By the term "high silica content," it is meant that the fibers contain more silica than any other compositional ingredient in the fibers. In fact, the silica content of these fibers after leaching are typically greater than any other glass fibers containing silica, including S-glass fibers, except crystalline quartz derived fibers or pure silica fibers. In one embodiment, it will be appreciated that the flexible fibrous material layer may be devoid of intumescent materials, sol gel-derived glass silica fibers and/or backing or reinforcing layers.

Generally, the leached glass fibers will have a silica content of at least 67 percent by weight. In certain embodiments, the leached glass fibers contains at least 90 percent by weight, and in certain of these, from about 90 percent by weight to less than 99 percent by weight silica. The fibers are also substantially shot free and exert a minimum holding pressure for holding said fragile structure within said housing of one of (i) at least about 10 kPa after 1000 cycles of testing at a hot face temperature of about 900° C., a gap bulk density of from about 0.3 to about 0.5 g/cm$^3$, and a percent gap expansion of about 5 percent, or (ii) at least about 50 kPa after 1000 cycles of testing at a hot face temperature of about 300° C., a gap bulk density of from about 0.3 to about 0.5 g/cm$^3$, and a percent gap expansion of about 2 percent The average fiber diameter of these leached glass fibers may be greater than at least about 3.5 microns, and often greater than at least about 5 microns. On average, the glass fibers typically have a diameter of about 9 microns, up to about 14 microns. Thus, these leached glass fibers are non-respirable.

Examples of leached glass fibers high in silica content and suitable for use in the production of a flexible fibrous material layer for a catalytic converter or other known gas-treating device include those leached glass fibers available from BelChem Fiber Materials GmbH, Germany, under the trademark BELCOTEX and from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber pre-yarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heat resistant to temperatures of up to 1100° C., and are typically shot free.

The REFRASIL fibers, like the BELCOTEX fibers, are amorphous leached glass fibers high in silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL fibers, have a melting point of about 1700° C.

The flexible fibrous material layer containing fibers of high silica content may employ up to 100 percent by weight of the leached and surface treated glass fibers containing silica. However, in other embodiments, the flexible fibrous material layer may optionally comprise other known fibers such as alumina/silica fibers, or other ceramic or glass fibers suitable for use in the production of flexible fibrous material layer for the particular temperature applications desired. Thus, alumina/silica fibers such as refractory ceramic fibers may be optionally employed for high temperature or wide ranging temperature applications. Other ceramic or glass fibers such as S-glass may be used with the leached glass silica fibers in similar or lower temperature applications. In such instances, however, the flexible fibrous material layer preferably includes at least 50 percent by weight of leached and surface treated glass fibers containing silica. In other words, the majority of the fiber utilized in the production of the mat will be leached and surface treated glass fibers containing silica, and in certain embodiments, at least 80 percent by weight of the fibers will be leached and surface treated glass fibers containing silica.

In certain alternative embodiments, fibers such as S2-glass and the like may be added to the flexible fibrous material layer in quantities of from greater than 0 to about 50 percent by weight, based upon 100 percent by weight of the total flexible fibrous material layer. In other alternative embodiments, the flexible fibrous material layer may include refractory ceramic fibers in addition to the leached glass fibers. When refractory ceramic fibers, that is, alumina/silica fibers or the like are utilized, they may be present in an amount ranging from greater than 0 to less than about 50 percent by weight, based upon 100 percent by weight of the total flexible fibrous material layer mat.

The flexible fibrous material layer containing fibers may or may not include a binder. Either a single type of binder or mixture of more than one type of binder may be included within the flexible fibrous material layer. Suitable binders include organic binders, inorganic binders and mixtures of these two types of binders. According to certain embodiments, the intumescent or non-intumescent flexible fibrous material layer, include one or more organic binders. The organic binders may be provided as a solid, a liquid, a solution, a dispersion, a latex, or similar form. The organic binder may comprise a thermoplastic or thermoset binder, which after cure is a flexible material that can be burned out of an installed mounting mat. Examples of suitable organic binders include, but are not limited to, acrylic latex, (meth)acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters.

The organic binder may be included in the flexible fibrous material layer in an amount of greater than 0 to about 20 weight percent, from about 0.5 to about 15 weight percent, from about 1 to about 10 weight percent, or from about 2 to about 8 weight percent, based on the total weight of the flexible fibrous material layer.

The flexible fibrous material layer may include polymeric binder fibers instead of, or in combination with, the resinous or liquid binder. These polymeric binder fibers may be used in amounts ranging from greater than 0 to about 20 percent by weight, from about 1 to about 15 weight percent, and from about 2 to about 10 weight percent, based upon 100 percent by weight of the total composition, to aid in binding the heat treated fibers together. Suitable examples of binder fibers include polyvinyl alcohol fibers, polyolefin fibers such as polyethylene and polypropylene, acrylic fibers, polyester fibers, ethyl vinyl acetate fibers, nylon fibers and combinations thereof.

In addition to organic binders, the flexible fibrous material layer may also include inorganic binder material. Without limitation, suitable inorganic binder materials include inorganic particulate materials, colloidal dispersions of alumina, silica, zirconia, and mixtures thereof.

The flexible fibrous material layer containing fibers may be prepared by any known techniques commonly used in the preparation of mounting mats. For example, using a papermaking process, the fibers may be mixed with a binder or other binder fibers to form a mixture or slurry. The fibrous components may be mixed at about a 0.25% to 5% consistency or solids content (0.25-5 parts solids to 99.75-95 parts water). The slurry may then be diluted with water to enhance formation, and it may finally be flocculated with a flocculating agent and drainage retention aid chemicals. The flocculated mixture or slurry may be placed onto a papermaking machine to be formed into a ply or sheet of fiber containing paper. Alternatively, the plies or sheets may be formed by vacuum casting the slurry. In either case, the plies or sheets are typically dried in ovens. For a more detailed description of standard papermaking techniques employed, see U.S. Pat. No. 3,458,329, the disclosure of which is incorporated herein by reference.

In other embodiments, the fibers may be processed into a mat by conventional means such as dry air laying. The mat at this stage has very little structural integrity and is very thick relative to conventional catalytic converter and diesel trap mounting mats. The resultant mat can therefore be dry needled, as is commonly known in the art, to densify the mat and increase its strength. Heat treatment of the fibers may occur prior to formation of the mat or after the mat is needled.

Where the dry air layering technique is used, the mat may be alternatively processed by the addition of a binder to the mat by impregnation to form a fiber composite. In this technique, the binder is added after formation of the mat, rather than forming the mat prepreg as noted hereinabove with respect to the conventional papermaking technique. This method of preparing the mat aids in maintaining fiber length by reducing breakage. It will be appreciated, however, that heat treatment, may occur prior to addition of any binder.

Methods of impregnation of the mat with the binder include complete submersion of the mat in a liquid binder system, or alternatively brushing, coating, dipping, rolling, splashing, or spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls, which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The flexible fibrous material layer can also be made in a batch mode, by immersing a section of the flexible fibrous material layer in a liquid binder, removing the prepreg and pressing to remove excess liquid, thereafter drying to form the composite and storing or cutting to size It is noted that flexible fibrous material layer produced from these fibers may be too low in density for easy use in certain catalytic converter applications. Therefore, they may undergo further densification by any manner known in the art to provide a higher density. One such manner of densification is to needle punch the fibers so as to intertwine and entangle them. Additionally or alternatively, hydro-entangling methods may be used. Another alternative is to press the fibers into a mat form by rolling them through press rollers. Any of these methods of densification of the mats or a combination of these methods can be readily used to obtain a mat of the desired form.

Regardless of which of the above-described techniques are employed, the resulting mat may be cut, such as by die stamping, to form mounting mats of exact shapes and sizes with reproducible tolerances. The mounting mat exhibits suitable handling properties upon densification as by needling or the like, meaning it can be easily handled and is not so brittle as to crumble in one's hand like many other fiber blankets or mats. It can be easily and flexibly fitted or wrapped around the catalyst support structure or like fragile structure without cracking, and then disposed within the catalytic converter housing. Generally, the mounting mat-wrapped fragile structure can be inserted into a housing or the housing can be built or otherwise fabricated around the mat-wrapped fragile structure.

According to one embodiment, the exterior surfaces of the fibers may be treated by applying an inorganic particulate material to at least portions of the fiber surfaces. Useful inorganic particulate materials that may be utilized to treat the exterior of the fiber surfaces of the fibers include, without limitation, colloidal dispersions of alumina, silica, zirconia, and mixtures thereof. According to one embodiment, the inorganic material used to treat the exterior surfaces of the fibers, thereby increasing the overall holding pressure performance of the mounting mat, is a colloidal dispersion of alumina. At least a portion of the exterior surfaces of at least a portion of the fibers of the flexible fibrous material layer may include a continuous or discontinuous coating of colloidal alumina, silica, zirconia, and mixtures thereof. The colloidal oxide may be applied to the exterior surfaces of the leached glass fibers by any suitable means, without limitation, by coating, dipping, spraying, splashing, and the like. The colloidal oxide may be applied to the exterior surfaces of the fibers in either a continuous or discontinuous pattern. Moreover, the process of applying the colloidal oxide to the exterior surfaces of the fibers may be carried out during or after manufacture of the glass fibers.

As an exhaust gas treatment device cycles from ambient temperature to operating temperature, the components comprising the device reach their individual operating temperatures. The operating temperature for any given component in the exhaust gas treatment device may be less than the operating temperature for the device itself, because some components are insulated from higher temperature components. As components heat, they will expand in proportion to their thermal expansion coefficients.

This expansion produces a change in the strain state of the component. Because all components will not experience identical thermal strain, thermal strain causes component interference forces to change. That is, a change in the strain state of the component causes a corresponding change in the stress state of the component, and a resultant change in the forces between it and other components with which it is engaged.

In certain embodiments, the multiple layer mounting system may be used as end cone insulation in an exhaust gas treatment device. According to certain embodiments, an end cone for an exhaust gas treatment device is also provided. The end cone generally comprises an outer metallic cone, an inner metallic cone and end cone insulation that is disposed within the gap or space between the outer and inner metallic end cones.

According to other embodiments, the end cone may comprise an outer metallic cone and cone insulation that is positioned adjacent to the inner surface of the outer metallic cone. According to these embodiments, the end cone assembly is not provided with an inner metallic cone. Rather, the cone insulation is rigidized in some manner to provide a self-supporting cone structure that is resistant to the high temperature gases flowing through the device.

An exhaust gas treatment device including at least one end cone is provided. The exhaust gas treatment device comprises a housing, a fragile structure positioned within the housing, an inlet and an outlet end cone assemblies for attaching exhaust pipes to the housing, each end cone assembly comprising an inner end cone housing and an outer end cone housing; and end cone insulation comprising the multiple layer mounting system described in the various embodiments discussed herein.

Figure 1A:
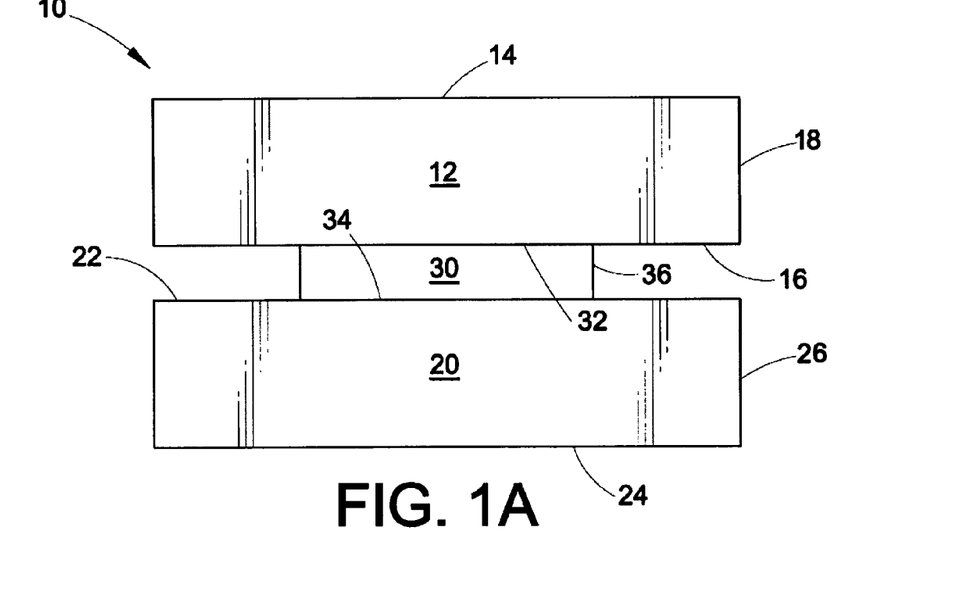
FIGS. 1A and 1B show an illustrative embodiment of a hybrid mounting mat for an exhaust gas treatment device.

FIG. 1A shows an illustrative embodiment of the hybrid mounting mat 10. Mat 10 includes a first layer 12 comprising an intumescent or non-intumescent sheet of inorganic fibers having a first major surface 14 and a second major surface 16 opposite the first major surface 14 and an outer perimeter 18. Hybrid mat 10 also includes second layer 20 comprising an intumescent or non-intumescent sheet of inorganic fibers having a first major surface 22 and a second major 24 surface opposite the first major surface and an outer perimeter 26. A microporous inorganic insulating layer 30 has a first major surface 32 and a second major surface 34 and an outer perimeter 36. The outer perimeter 36 of the microporous inorganic insulating layer 30 is smaller than the outer perimeters 18, 26 of the first 12 and second 20 layers.

Figure 1B:
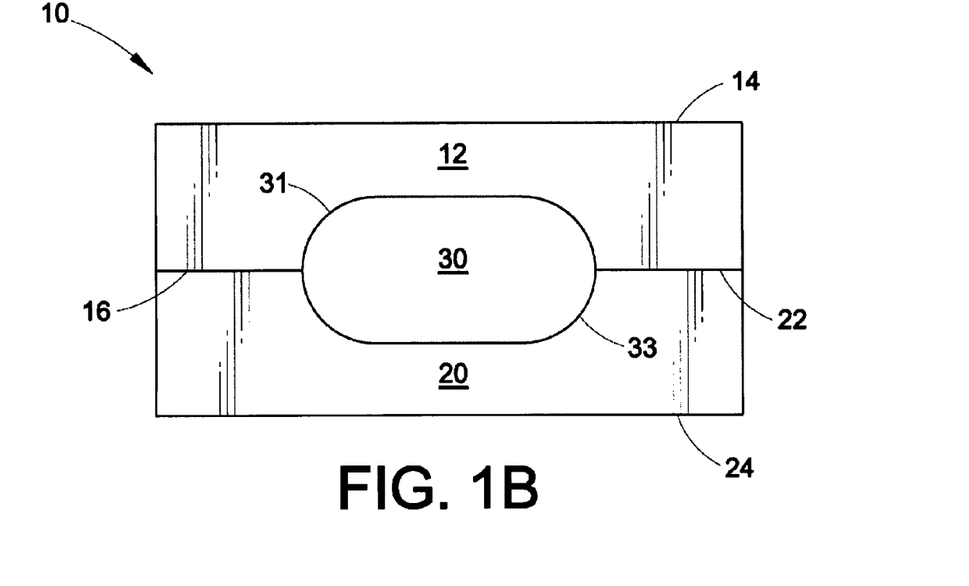

FIG. 1B shows the microporous inorganic insulating layer 30 sealed entirely within the perimeters of said first layer 12 and second layer 20. Still referring to FIG. 1B, second major surface 16 of first layer 12 is pressed into contact with first major surface 22 of second layer 20. During the pressing and sealing process, insulating layer 30 may become somewhat rounded at opposite lateral edges 31, 33. As shown in FIG. 1B, the entire layer 30 is encapsulated by the two intumescent or non-intumescent layers.

Figure 2:
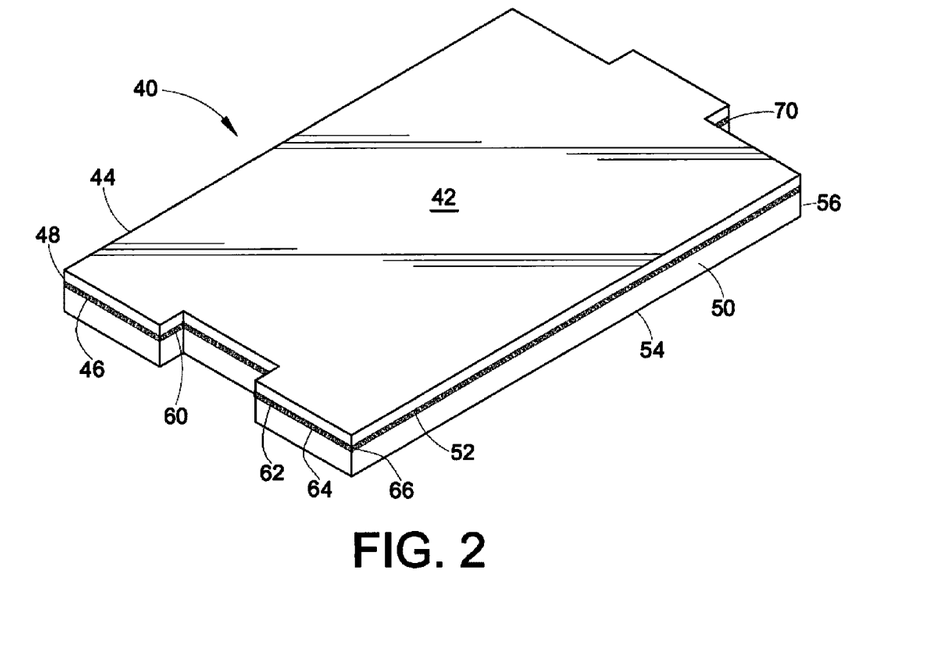
FIG. 2 shows an illustrative embodiment of a hybrid mounting mat for an exhaust gas treatment device.

FIG. 2 shows another illustrative embodiment of the hybrid mounting mat. Mat 40 includes a first layer 42 comprising intumescent or non-intumescent sheet of inorganic fibers having a first major surface 44 and a second major surface 46 opposite the first major surface 44 and an outer perimeter 48. Hybrid mat 40 also includes second layer 50 comprising an intumescent or non-intumescent sheet of inorganic fibers having a first major surface 52 and a second major surface 54 opposite the first major surface and an outer perimeter 56. A microporous inorganic insulating layer 60 has a first major surface 62 and a second major surface 64 and an outer perimeter 66. The outer perimeter 66 of the microporous inorganic insulating layer 60 is substantially coextensive with the outer perimeters 48, 56 of the first 42 and second 50 layers. A hydrophobic or water resistant coating 70 is applied to the perimeter edges of the microporous inorganic insulating layer to protect it from exposure to liquid, liquid condensate, or liquid vapor.

Figure 3A:
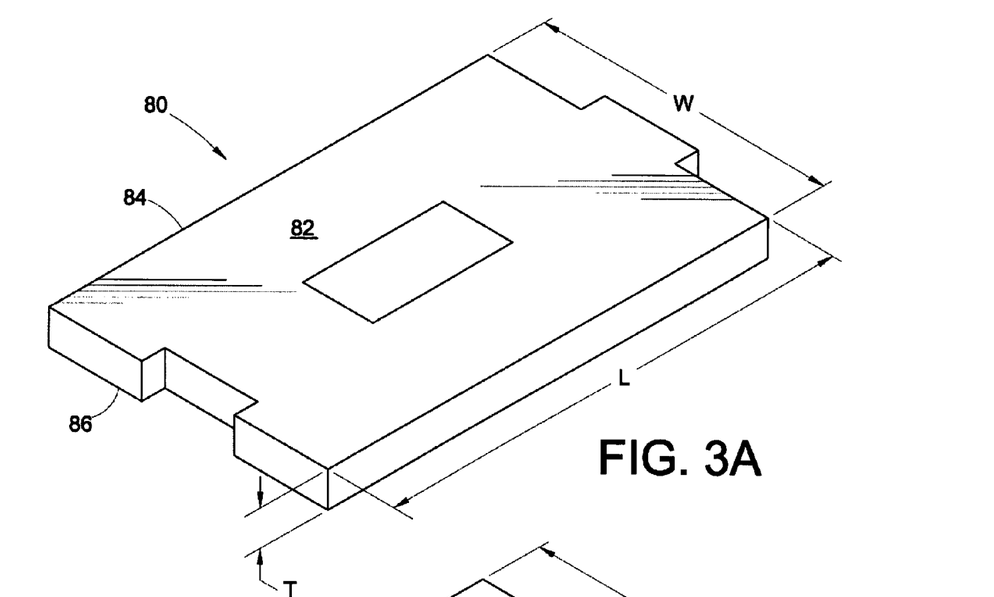
FIGS. 3A-3C show an illustrative embodiment of a hybrid mounting mat for an exhaust gas treatment device.
Figure 3B:
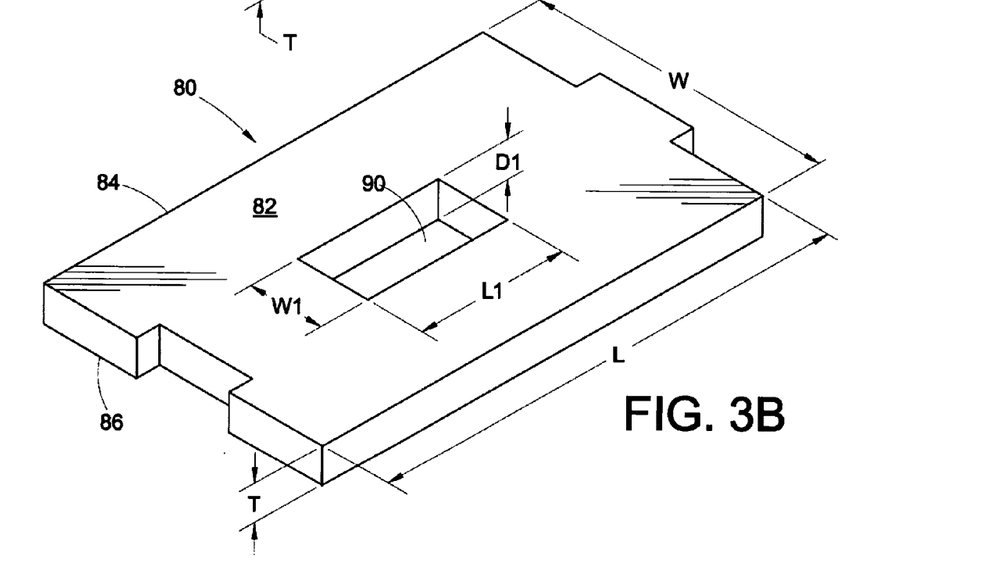
Figure 3C:
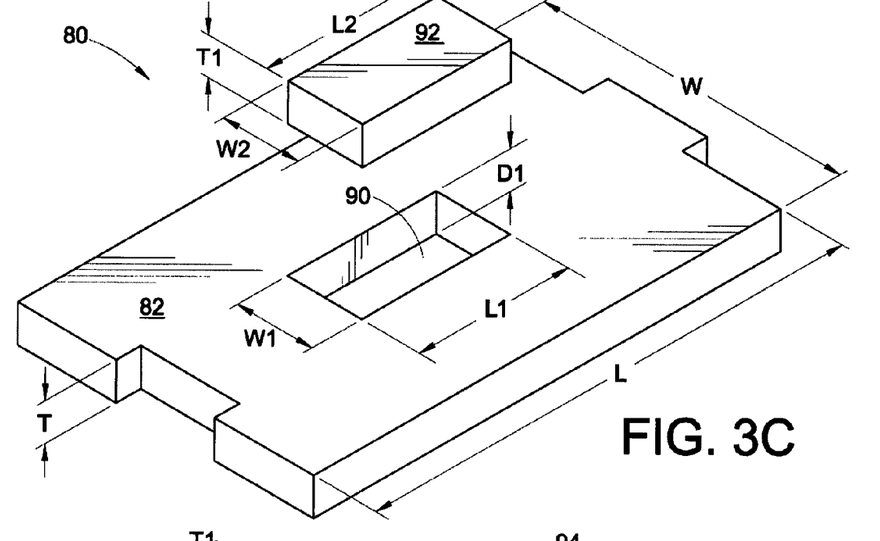

FIGS. 3A, 3B and 3C are views of another illustrative embodiment of the hybrid mounting mat. Mounting mat 80 includes base layer 82 of non-intumescent or intumescent material. Base layer 82 has a first major surface 84, and a second major surface 86 opposite said first major surface 84. Base layer has a width W and a length L. As used herein, the term width refers to the shorter of two dimensions in the plane of a base layer 82 of mat 80. The term length refers to the longer of two dimensions in the plane of base layer 82 of mat 80. The terms width and length are interchangeable if both dimensions are substantially equal. The width and the length refer to the outer dimensions of a layer or mat. As used herein, the term area refers to the area of a layer or mat calculated from the outer dimensions of a layer or mat (i.e., for a rectangular mat, the area is equal to the length multiplied by the width). Base layer 82 has a thickness T that extends between the first 84 and second 86 major surface(s). Insert 92 is shown outside of cavity 90.

FIG. 3C shows base layer 82 with insert 92. Base layer 82 further includes a cavity or trough 90 formed in the thickness T of base layer 82. Cavity 90 has a length L1, a width W1 and a depth D1. An insert 92 comprising a microporous inorganic insulating material is provided with a length L2, width W2 and thickness T1 that is slightly smaller than the length L1 and width W1 of cavity 90 such that insert 92 can be fitted into cavity 90. As shown in FIG. 3C, insert 92 may include a thickness T1 that is the same as the depth D1 of cavity 90.

Figure 4:
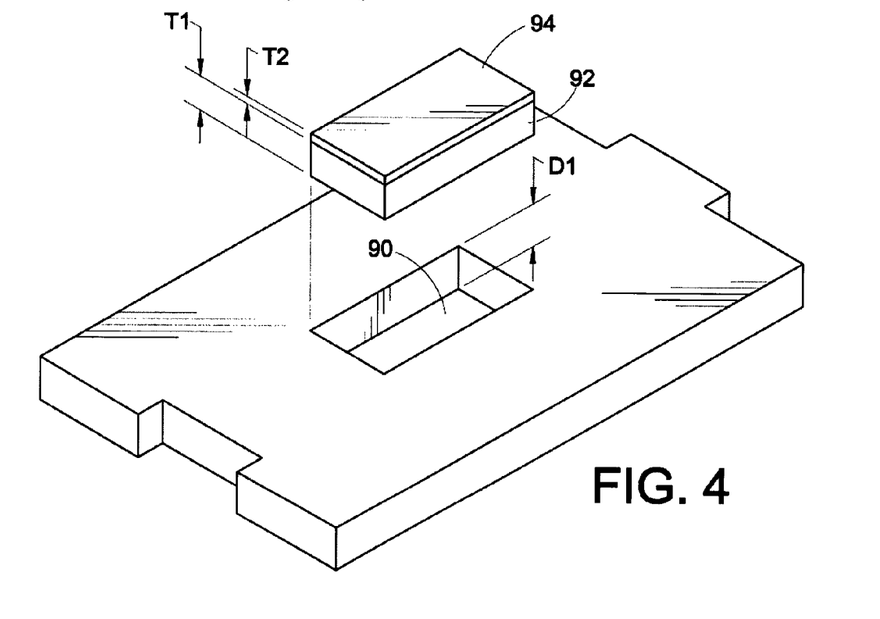
FIG. 4 shows an illustrative embodiment of a hybrid mounting mat for an exhaust gas treatment device.

As shown in FIG. 4, alternatively, thickness T1 of insert 92 may be smaller than the depth D1 of cavity 90 and therefore an additional layer 94 of intumescent or non-intumescent material having thickness T2 may be placed over insert 92 within cavity 90. According to this embodiment, thickness T1 of insert 92 and thickness T2 of additional layer 94 together equal the depth D1 of cavity 90 of base layer 82.

Figure 5:
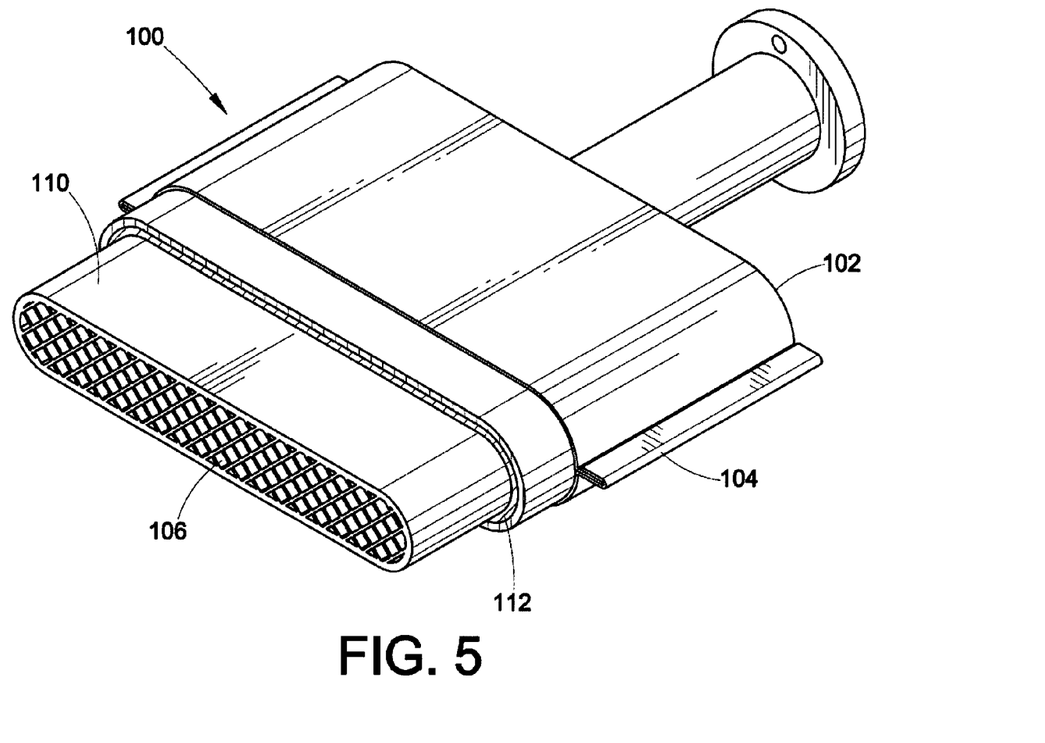
FIG. 5 shows an illustrative embodiment of an exhaust gas treatment device incorporating a hybrid mounting mat.

FIG. 5 shows one illustrative configuration of an exhaust gas treatment device is shown as a catalytic converter, generally designated by the numeral 100. It should be understood that the exhaust gas treatment device is not limited to use in the catalytic converter shown in illustrative FIG. 5, and so the configuration is shown only to exemplify the device. In fact, the mounting mat may be used to mount or support any fragile structure suitable for treating exhaust gases, such as a diesel catalyst structure, a diesel particulate filter, or the like. Catalytic converter 100 may include a generally tubular housing 102, typically formed of two pieces of metal, for example, high temperature-resistant steel, held together by flange 104. Housing 102 includes an inlet 106 at one end and an outlet (not shown) at its opposite end. The inlet 106 and outlet are suitably formed at their outer ends, whereby they may be secured to conduits in the exhaust system of an internal combustion engine. Device 100 contains a catalyst support structure, such as a frangible ceramic monolith substrate 110, which is supported and restrained within housing 102 by the mounting mat 112. Substrate 110 may include a plurality of gas-pervious passages which extend axially from its inlet end face at one end to its outlet end face at its opposite end. Substrate 110 may be constructed of any suitable refractory or ceramic material in any known manner and configuration.

The substrate mounting system described above is also useful in a variety of applications such as conventional automotive catalytic converters for, among others, motorcycles and other small engine machines, and automotive preconverters, as well as high temperature spacers, gaskets, and even future generation automotive underbody catalytic converter systems. Generally, they can be used in any application requiring a mat or gasket to exert holding pressure at room temperature and, more importantly, to provide the ability to maintain the holding pressure at elevated temperatures of from about 20° C. to at least about 1200° C., including during thermal cycling.

Example

Three mounting mats were created according to the procedures and processes described above. Mat 1 comprised two layers comprising fibrous mats with a single microporous inorganic insulation layer comprising microporous silica placed between the two fibrous layers, with the peripheral edges of the microporous inorganic insulation layer being completely exposed. Mats 2 and 3 were similar to Mat 1, except that the microporous inorganic insulation layer was completely enclosed between the two fibrous mats. The microporous inorganic insulation layer of Mat 2 was 20 mm narrower than the two fibrous mats, while the microporous insulation layer of Mat 3 was 40 mm narrower than the two fibrous mats.

Mats 1, 2 and 3 were placed into substantially identical catalytic converters. A thermocouple was spot welded onto the shell of each catalytic converter. The substrates of each catalytic converter were electrically wired and heated to a temperature of 1,000° C. over a period of 20 minutes. The substrates were then maintained at a temperature of 1,000° C. for a period of 30 minutes, and the temperature of the shells was recorded. The catalytic converters were then allowed to cool to room temperature, after which the catalytic converters were soaked for one minute in a tray containing about ¼ inch (0.6 cm) of water and allowed to dry overnight. The catalytic converters were then once again heated to a temperature of 1,000° C. over a period of 20 minutes. The substrates were once again maintained at a temperature of 1,000° C. for a period of 30 minutes, and the temperature of the shells was recorded a second time. The results are shown in TABLE II.

TABLE II

| | Increase in Shell Temp. After Exposure to Water | Percent Increase in Temp. |
|---|---|---|
| Mat 1 | 56° C. | 15% |
| Mat 2 | 29° C. | 7% |
| Mat 3 | 37° C. | 9% |

These results show that the subject mounting mats perform more effectively when the microporous inorganic insulation layer is protected from exposure to water. Further, because Mat 2 performed better than Mat 3, these results show that the microporous inorganic insulation layer does indeed increase the overall effectiveness and insulative properties of the subject mounting mats.

While the mounting mat has been described in connection with various embodiments, as shown in the various figures, it is to be understood that other similar embodiments may be used or modifications and additions may be made to the described embodiments for performing the same function. Furthermore, the various illustrative embodiments may be combined to produce the desired results. Therefore, the mounting mat and exhaust gas treatment device should not be limited to any single embodiment, but rather construed in breadth and scope in accordance with the recitation of the appended claims.

The invention claimed is:

1. A single or multiple layer mounting mat comprising microporous inorganic insulating material and a flexible fibrous material, wherein the microporous inorganic insulating material is shielded from exposure to liquid or liquid vapor, wherein
the flexible fibrous material comprises:
a layer of inorganic fibrous material having a first major surface, a second major surface opposite the first major surface and a thickness extending between the first and second major surfaces; and
a cavity formed in a portion of the layer thickness; and
the microporous inorganic insulating material comprises an insert of microporous inorganic insulation material disposed within the cavity.

2. The mounting mat of claim 1, wherein the layer of inorganic fibrous material surrounds the outer perimeter of the insert of microporous inorganic insulation material.

3. The mounting mat of claim 1, wherein a second layer of inorganic fibrous material is positioned over the microporous inorganic insulating material disposed within the cavity.

4. The mounting mat of claim 1, wherein the perimeter edges of the microporous inorganic insulation insert have a hydrophobic coating thereon.

5. The mounting mat of claim 1, wherein the major surfaces and/or the peripheral edges of the microporous inorganic insulation insert are at least partially coated with a hydrophobic coating.

6. An exhaust gas treatment device comprising:
a housing;
a fragile structure located within the housing; and
the mounting mat of claim 1 disposed between the housing and the fragile structure.

7. An end cone for an exhaust gas treatment device comprising:
an outer metallic cone;
an inner metallic cone; and
cone insulation disposed between the outer and inner metallic cones, the cone insulation comprising the mounting mat of claim 1.

8. An end cone for an exhaust gas treatment device comprising:
an outer metallic cone; and
self-supporting cone insulation comprising the mounting mat of claim 1 disposed adjacent the inner surface of the outer metallic cone.

* * * * *